(No Model.)
T. LOTTERMOSER.
PARASOL HOLDER FOR BICYCLES.
No. 593,360. Patented Nov. 9, 1897.
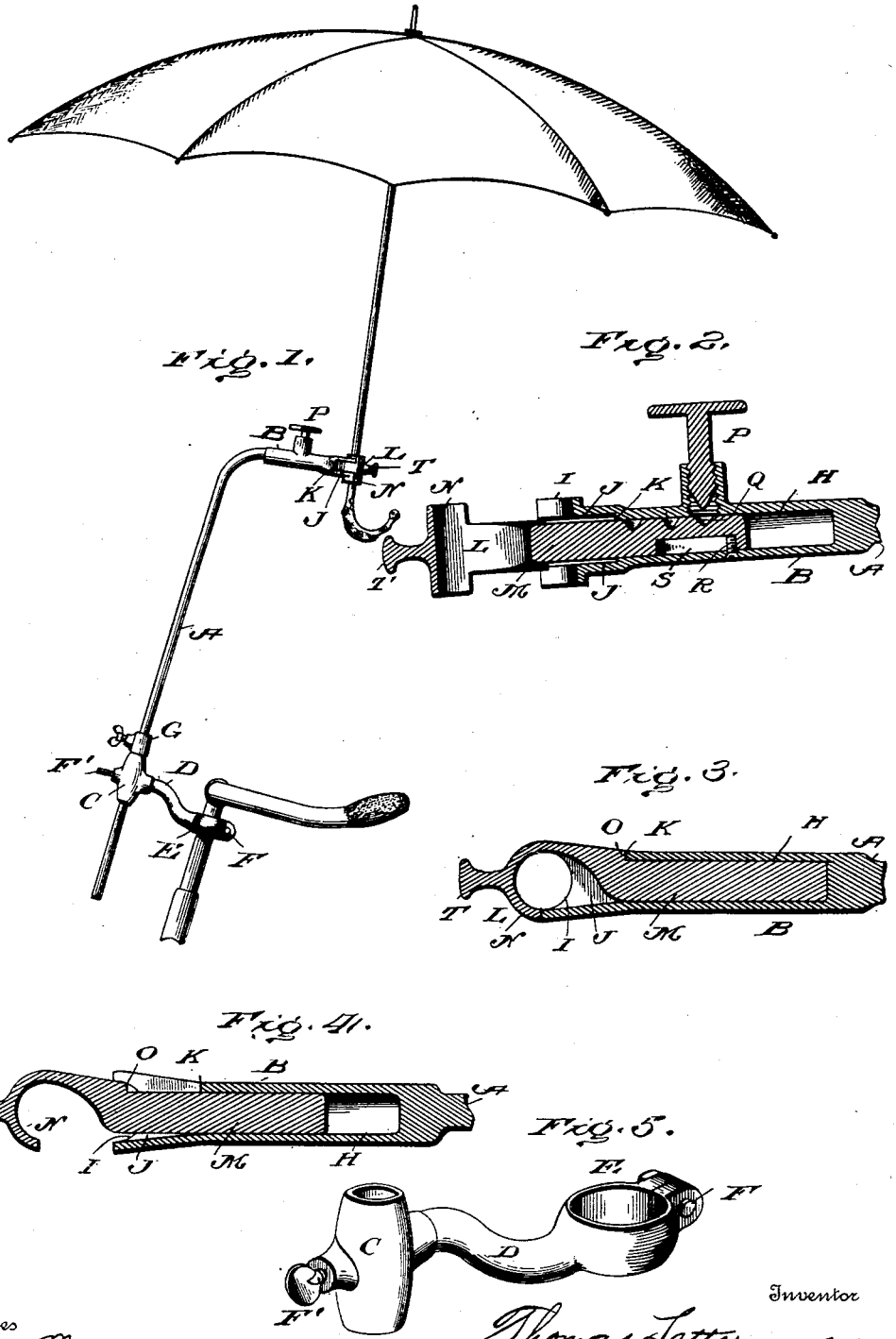
Witnesses
Simon T. Massor
Thos. E. Robertson
Inventor
Thomas Lottermoser
by Bishop & Imirie
Attorneys
THE NORRIS PETERS CO., PHOTO-LITHO., WASHINGTON, D. C.

UNITED STATES PATENT OFFICE.

THOMAS LOTTERMOSER, OF LUDINGTON, MICHIGAN.

PARASOL-HOLDER FOR BICYCLES.

SPECIFICATION forming part of Letters Patent No. 593,360, dated November 9, 1897.

Application filed July 16, 1897. Serial No. 644,866. (No model.)

*To all whom it may concern:*

Be it known that I, THOMAS LOTTERMOSER, a citizen of the United States, residing at Ludington, in the county of Mason and State of Michigan, have invented certain new and useful Improvements in Parasol-Holders for Bicycles, of which the following is a full, clear, and exact specification.

My invention is a device adapted to be attached to a bicycle for the purpose of carrying a parasol or canopy and thereby protecting the rider from the sun; and it consists in certain novel features hereinafter described and claimed.

In the annexed drawings, Figure 1 is a side view of the device, showing it in its operative position. Fig. 2 is an enlarged partly-sectional view of the clamp for engaging the parasol-stick, the sliding member being drawn out so as to receive the stick. Figs. 3 and 4 are horizontal sections of the same, and Fig. 5 is a perspective view of the clamp-bracket for attaching the device to the bicycle steering-head.

In carrying out my invention I employ a small steel rod or standard A, having its upper end B bent at such an angle that when it is in a horizontal position the main body of the rod or standard will follow the line of slant usually given the steering-head of a bicycle. The standard or rod A passes through a sleeve C, formed on one end of an arm D, having a split-ring clamp E at its other end, the arm being of an ogee form, so as to present a somewhat ornamental appearance. The clamp E passes around the steering-head and is secured thereon by a bolt F, inserted through its ends, while the sleeve C carries a thumb-screw F', adapted to hold the standard or rod A therein. To prevent the said rod dropping onto the rider in the event of a sudden loosening of the thumb-screw F', I provide the stop G, which is adjustably secured on the rod and is adapted to rest upon the upper end of the sleeve C.

The upper horizontal end B of the standard is slightly enlarged and is formed into a tube H, as shown. The end of this tube is enlarged and provided with the curved recesses I, so as to form the stationary member of the clamp for holding the parasol or umbrella stick. One side of the enlarged head is cut away, as shown, to provide the horizontal guide-walls J and the shoulder K. The sliding member L of the clamp is constructed with a stem M, fitting and sliding within the tube H, and a curved clamping head or hook N, adapted to fit around the umbrella-stick and bind the same against and within the recesses I. On its outer side the sliding clamp member is provided with the angular offset O, fitting between the guide-walls J and adapted to impinge against the shoulder K, so as to limit the inward movement of the member and thereby prevent crushing of the umbrella-stick. The offset O, fitting between the guide-walls J, also prevents twisting of the sliding member and thereby avoids lateral breaking of the stick. A set-screw P is mounted in the tube H and adapted to engage a notch Q in the stem M to hold the clamp in its adjusted position, and loss of the sliding member is prevented by a pin R, fitted in the tube H and engaging a groove S in the bottom of the stem. A small knob T is provided on the outer end of the sliding member to facilitate manipulation of the clamp.

The practical operation of the device will be readily understood. The clamp E is secured to the steering-head of the bicycle and the standard adjusted to the proper height, after which the upper stick is secured by and in the clamp H L. The device is very simple and light and can be easily adjusted to hold an umbrella or parasol at any desired point to properly shade the rider.

Having thus described my invention, what I claim, and desire to secure by Letters Patent, is—

An attachment for bicycles consisting of a bracket adapted to be secured around the steering-head of a bicycle, a standard adjustably supported by said bracket and having its upper end formed into a horizontal tube provided with recesses in its end and horizontal guide-walls in one side, a slide having a stem fitting in the tube, an offset engaging the horizontal guide-walls and a hook at its extremity adapted to coact with the recesses in the end of the tube, and means for adjustably securing the slide in the tube.

THOMAS LOTTERMOSER.

Witnesses:
 HENRY YECH,
 FRANK BRADE.